(12) United States Patent
Ishikawa et al.

(10) Patent No.: US 8,874,411 B2
(45) Date of Patent: Oct. 28, 2014

(54) PROCESSING SYSTEM, METHOD, AND PROGRAM FOR MODELING SYSTEM

(75) Inventors: Hiroshi Ishikawa, Kanagawa-ken (JP); Takashi Sakairi, Kanagawa-ken (JP); Junya Shimizu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 12/962,792

(22) Filed: Dec. 8, 2010

(65) Prior Publication Data

US 2011/0144961 A1    Jun. 16, 2011

(30) Foreign Application Priority Data

Dec. 15, 2009   (JP) ................ 2009-283737

(51) Int. Cl.
G06F 17/50    (2006.01)
G06F 11/26    (2006.01)
G06F 13/10    (2006.01)

(52) U.S. Cl.
CPC .......... *G06F 17/5009* (2013.01); *G06F 11/261* (2013.01); *G06F 13/105* (2013.01); *G06F 17/50* (2013.01); *G06F 2217/16* (2013.01)
USPC ............................ 703/1; 703/2; 703/6; 703/7

(58) Field of Classification Search
None
See application file for complete search history.

(56) References Cited

U.S. PATENT DOCUMENTS 7,962,317 B1 *   6/2011   Kanapka ................. 703/2

FOREIGN PATENT DOCUMENTS

| JP | 07-281714 | 10/1995 |
|---|---|---|
| JP | 11-261436 | 9/1999 |
| JP | 2005-222420 | 8/2005 |
| JP | 2005-301764 A | 10/2005 |
| JP | 2006-028746 | 2/2006 |
| JP | 2006-086681 | 3/2006 |
| JP | 2006-260244 | 9/2006 |
| JP | 2009-176010 | 8/2009 |
| WO | WO99/57617 | 11/1999 |

OTHER PUBLICATIONS

Delport, Ruanne. "Process identification using second order Volterra models for nonlinear model predictive control design of flotation circuits", 2005.*

Rosenburg et al. "Embedded System Development using SysML", 2010.*

Modelica Inc. "Modelica—A Unified Object-Oriented Language for Physical Systems Modeling: Language Specification", Version 3.2, Mar. 24, 2010.*

(Continued)

*Primary Examiner* — Shambhavi Patel
(74) *Attorney, Agent, or Firm* — Jeff Tang

(57) ABSTRACT

A processing system, method, and program for a modeling system. A math equation including a differential equation is prepared. A CAS solves the differential equation normally and by using an interval coefficient in accordance with an interval analysis technique. A coefficient vector of the two solutions are compared to determine if a distance between the vectors is equal to or less than a preset value, and if so, the CAS solves the math equation including a differential equation with the target coefficient set to zero. The coefficient vectors of the solution thus obtained and the normally solved solution are compared to determine if the distance between the vectors is equal to or less than a preset value, and if so, the differential equation is simplified by omitting a term of the target coefficient from the differential equation.

18 Claims, 8 Drawing Sheets

(56) References Cited

OTHER PUBLICATIONS

Li et al. "A Hybrid Approach to Nonlinear Macromodel Generation for Time-Varying Analog Circuits", ACM 2003.*

Fonoage, et al. "Mechanisms for Requirements Driven Component Selection and Design Automation", 2009.*

Namihiko Inoue, "Reduction of Numerical Model Dimensions . . . Algorithm", Annual Report of BRI, 1998, p. 45-47.

* cited by examiner $x[i+1] = Ax[i] + Bu[i]$
$y[i] = Cx[i]$ $$A = \begin{bmatrix} 0.811 & -0.035 & 0.050 & 0.331 \\ 0.004 & 0.941 & 0.018 & 0.040 \\ 0.109 & 0.009 & 0.632 & 0.108 \\ -0.319 & -0.025 & -0.145 & -0.839 \end{bmatrix}$$

$$B = \begin{bmatrix} -0.013 & 0.002 \\ -0.001 & 0.010 \\ -0.078 & 0.001 \\ 0.009 & 0.014 \end{bmatrix}$$

$$C = \begin{bmatrix} 0.169 & -0.960 & -0.076 & -0.377 \\ 0.666 & 0.084 & 0.626 & 0.661 \end{bmatrix}$$

··· INDICATES OMISSIBLE ELEMENT AS ZERO

PROCESSING SYSTEM, METHOD, AND PROGRAM FOR MODELING SYSTEM

CROSS REFERENCE TO RELATED APPLICATION

This application claims priority under 35 U.S.C. 119 from Japanese Application 2009-283737, filed Dec. 15, 2009, the entire contents of which are herein incorporated by reference.

BACKGROUND OF THE INVENTION

1. Field of the Invention

The present invention relates to a modeling system for designing a mechanical apparatus such as an automobile, a robot, or an aircraft. More specifically, the present invention relates to a system, method and program for processing a math equation used in a modeling system.

2. Description of Related Art

Heretofore, a simulation modeling tool such as MAT-LAB®/SIMULINK® has been used to create and test a model. Such a model thus created and tested is thereafter implemented on a real machine. Modeling techniques using MATLAB®/SIMULINK® are described in a large number of patent application publications such as Japanese Patent Application Publication No. 2005-222420.

Meanwhile, modeling of a mechanical apparatus by use of SysML, which is an extension of UML, has recently begun as disclosed in Japanese Patent Application Publication No. 2009-176010.

In MATLAB®/SIMULINK®, the behavior of a model results in a differential equation in many cases, and the behavior or a constraint of an element of a model is also described using a math equation in UML/SysML.

In the aforementioned cases, how to handle the described math equation model still remains as a challenge to be solved, as discussed in Japanese Patent Application Publication No. Hei 7-281714.

As a control strategy for designing a certain product, there is a demand for determining whether a certain complex math equation model can be more simply expressed when a system description designed on the basis of general evaluation functions is used in specific modeling. Such a demand arises because when setting a complex math equation model without any simplification, it leads to a complex structure and sometimes causes problems such as an increase in the material cost and the manufacturing cost. In this respect, describing an equivalent function using a simpler math equation model, if possible, is very significant in terms of cost savings.

However, a problem in a control strategy design by SysML or other modeling tools is that criterions for the appropriateness of the level of detail are unclear for a system description using a math equation or SIMULINK®.

For example, how detailed of a description is needed to describe a math equation such as an internal block diagram as a constraint in SysML, or a system element as a SIMULINK® model has been dependent on an aspect where the modeling is used or a subjective view of the developer of the model.

In addition, in modeling of a control portion in focus, the modeling using a system description designed on the basis of general evaluation criterions alone causes the model of the control target in focus to have meaning in a wide range. Thus, an excessively complex control system is likely to be designed in this case. In order to avoid such a situation, whether a portion that can be simplified (hereinafter, referred to as a "simplifiable portion") exists or not needs to be determined on the basis of quantitative criterions for the appropriateness of the level of detail of the modeling. Such a technique, however, has been unknown so far.

BRIEF SUMMARY OF THE INVENTION

To overcome these deficiencies, the present invention provides a control method for a modeling system that designs by computer processing, the method including: obtaining a math equation from a model to be designed, finding a first solution from the math equation, finding a second solution from the math equation with one coefficient in series set as an interval, finding a first distance between a first vector and a second vector with a coefficient of the first solution set as the first vector and with a coefficient of the second solution set as the second vector, finding a third solution from the math equation with the one coefficient set to zero in response to the fact that the first distance is not greater than a predetermined value, finding a second distance between the first vector and a third vector with a coefficient of the third solution set as the third vector, and determining that a term of the one coefficient in the math equation is omissible, in response to the fact that the second distance is not greater than a predetermined value.

According to another aspect of the invention, the present invention provides a computer program product for a modeling system that designs, the computer program product including: a computer readable storage medium having computer readable program code embodied therewith, the computer readable program code including: computer readable program code configured to: obtain a math equation from a model to be designed, find a first solution from the math equation, find a second solution from the math equation with one coefficient in series set as an interval, find a first distance between a first vector and a second vector with a coefficient of the first solution set as the first vector and with a coefficient of the second solution set as the second vector, find a third solution from the math equation with the one coefficient set to zero in response to the fact that the first distance is not greater than a predetermined value, find a second distance between the first vector and a third vector with a coefficient of the third solution set as the third vector, and determine that a term of the one coefficient in the math equation is omissible, in response to the fact that the second distance is not greater than a predetermined value.

According to yet another aspect of the invention, the present invention provides a modeling system that designs by computer processing, the system comprising: means for creating or editing a model to be designed, means for obtaining a math equation from the model, calculation means having a function to find a solution of the math equation, means for causing the calculation means to calculate the math equation to which an interval of terms of the math equation is applied, means for finding a distance between two different solutions obtained by the calculation means, and means for simplifying a math equation by omitting terms from the math equation, wherein the math equation is simplified by the means for simplifying the math equation, in response to the distance between the solutions being smaller than a predetermined distance.

DETAILED DESCRIPTION OF THE PREFERRED EMBODIMENTS

Figure 1:
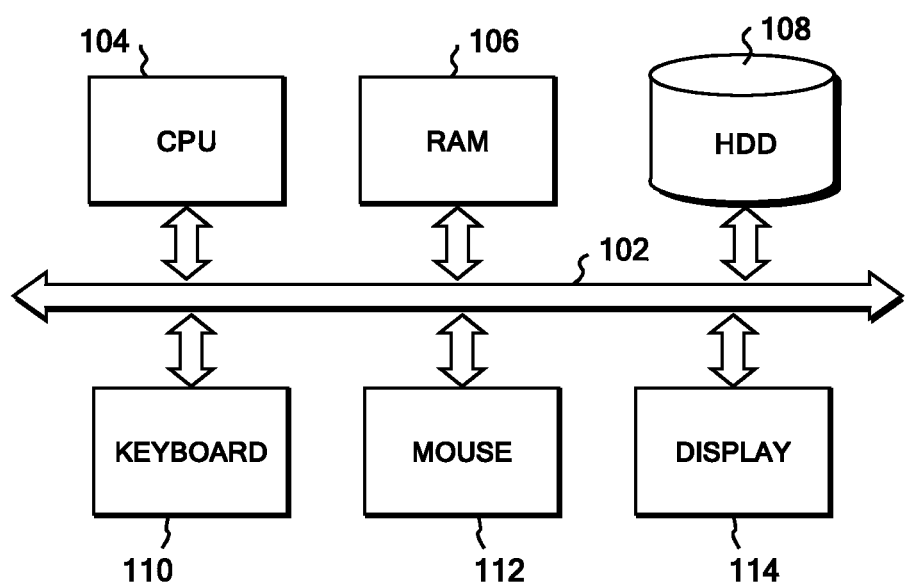
FIG. 1 is a block diagram of an example of a hardware configuration for carrying out the present invention.

Hereinafter, an embodiment of the present invention will be described on the basis of the drawings. Unless otherwise specified, the same reference numerals are used to denote the same objects throughout the drawings. It is to be understood that the description given below is only of one embodiment of the present invention and is not intended to limit the present invention to the contents described in this embodiment.

FIG. 1 shows a block diagram of computer hardware for implementing an example of a system configuration and processing for carrying out an embodiment of the present invention. In FIG. 1, a CPU 104, a main memory (RAM) 106, a hard disk drive (HDD) 108, a keyboard 110, a mouse 112, and a display 114 are connected to a system path 102. A CPU based on 32-bit or 64-bit architecture is preferably used as the CPU 104. For example, PENTIUM® 4, CORE™ 2 DUO, or XEON® from Intel, Inc., Athlon™ from AMD, Inc., or others can be used as the CPU 104. A memory with a capacity of at least 2 GB is preferably used as the main memory 106.

Although not illustrated as an individual element, an operating system is previously installed on the hard disk drive 108. Any operating system compatible with the CPU 104, such as WINDOWS® 7, WINDOWS® XP, or WINDOWS® 2000 from Microsoft Inc., MAC OS® from Apple, Inc., LINUX®, or other operating systems compatible with the CPU 104 can be used.

In addition, IBM® RATIONAL® RHAPSODY®, which is a UML/SysML modeling system available from International Business Machines Corporation, and MATLAB®/SIMULINK®, which is a simulation modeling system available from The MathWorks, Inc., are installed on the hard disk drive 108. In the functional block diagram shown in FIG. 2, the UML/SysML modeling system is illustrated as a block 202 while the MATLAB®/SIMULINK® is illustrated as a block 204.

Further, Maxima is installed on the hard disk drive 108 as a computer algebraic system (CAS). Note that, the CAS usable in this embodiment is not limited to Maxima, and any available CAS such as MAPLE™ available from MAPLESOFT®, MATHEMATICA® available from Wolfram Research, Inc., or others may be used in this embodiment. Alternatively, Symbolic Math Toolbox in Toolbox of MATLAB® may be used.

Figure 2:
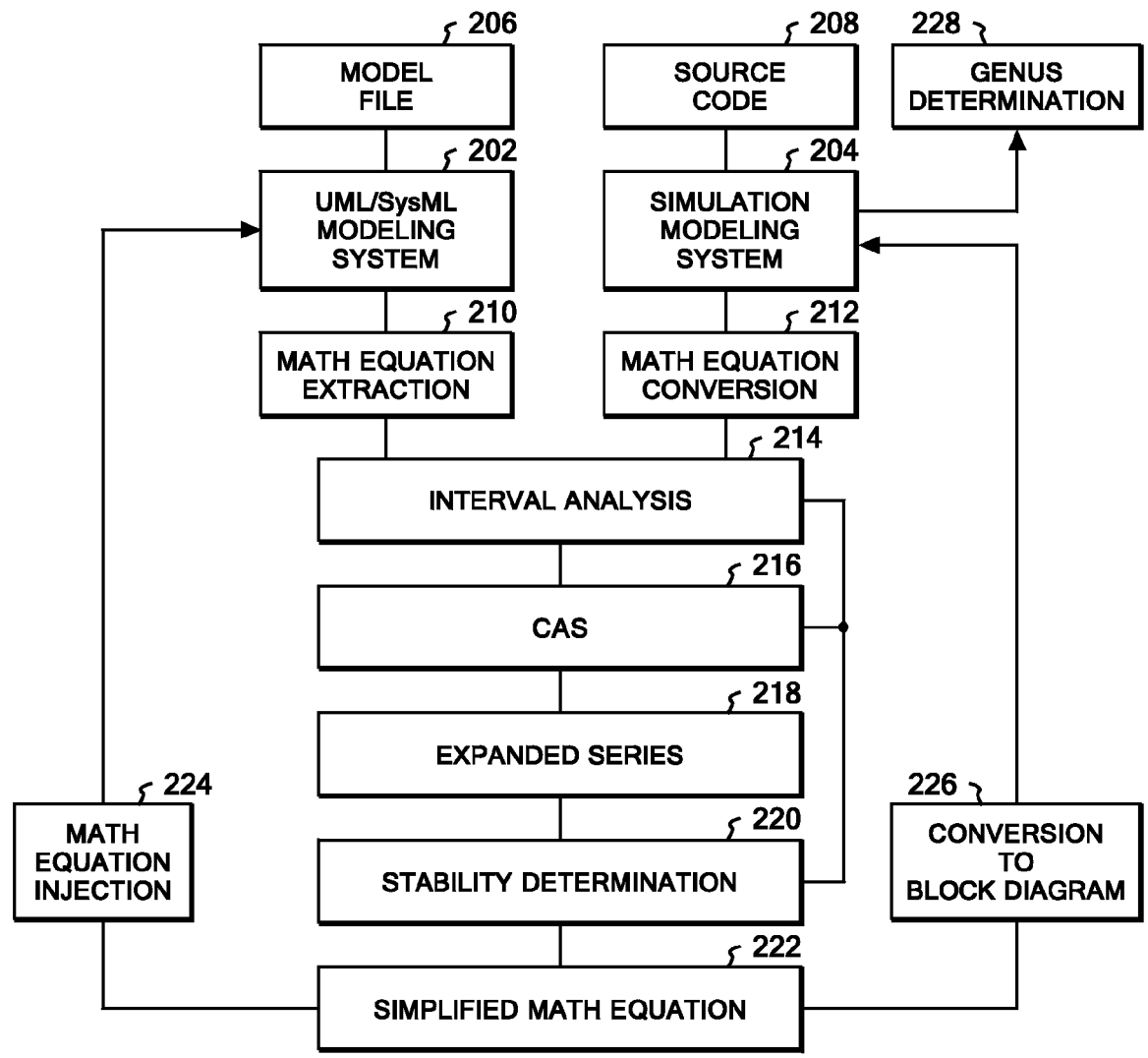
FIG. 2 is a functional block diagram for carrying out the present invention.

Further, the hard disk drive 108 stores therein a source model file 206 for the UML/SysML modeling system 202, and a source code 208 for the simulation modeling system, which are shown in FIG. 2 and will be described later.

The hard disk drive 108 further stores therein a math equation extraction module 210, a math equation conversion module 212, an interval analysis module 214, a stability determination module 220, a math equation injection module 224, a conversion-to-block diagram module 226, and a genus determination module 228. These modules are read into the main memory 106, by action of the operating system as appropriate, to thus be executed.

The keyboard 110 and the mouse 112 are used for starting a program (not shown) loaded into the main memory 106 from the operating system or the hard disk drive 108 and then displayed on the display 114, and also used for inputting characters.

The display 114 is preferably a liquid crystal display, and a display with any optional resolution such as XGA (1024×768 resolution) or UXGA (1600×1200 resolution) can be used, for example. Although not illustrated, the display 114 displays graph data to be processed or show a degree of similarity between graphs.

Next, a functional block diagram according to the present invention will be described with reference to FIG. 2. As described above, IBM® RATIONAL® RHAPSODY® is employed as the UML/SysML modeling system 202 in this embodiment. However, the UML/SysML modeling system 202 is not limited to this, and any UML/SysML modeling system can be used.

On the UML/SysML modeling system 202, the user creates a model design in accordance with UML/SysML rules, and also saves the created model design in the hard disk drive 108 as the model file 206. The user can also read and edit the model design as needed.

Figure 3:
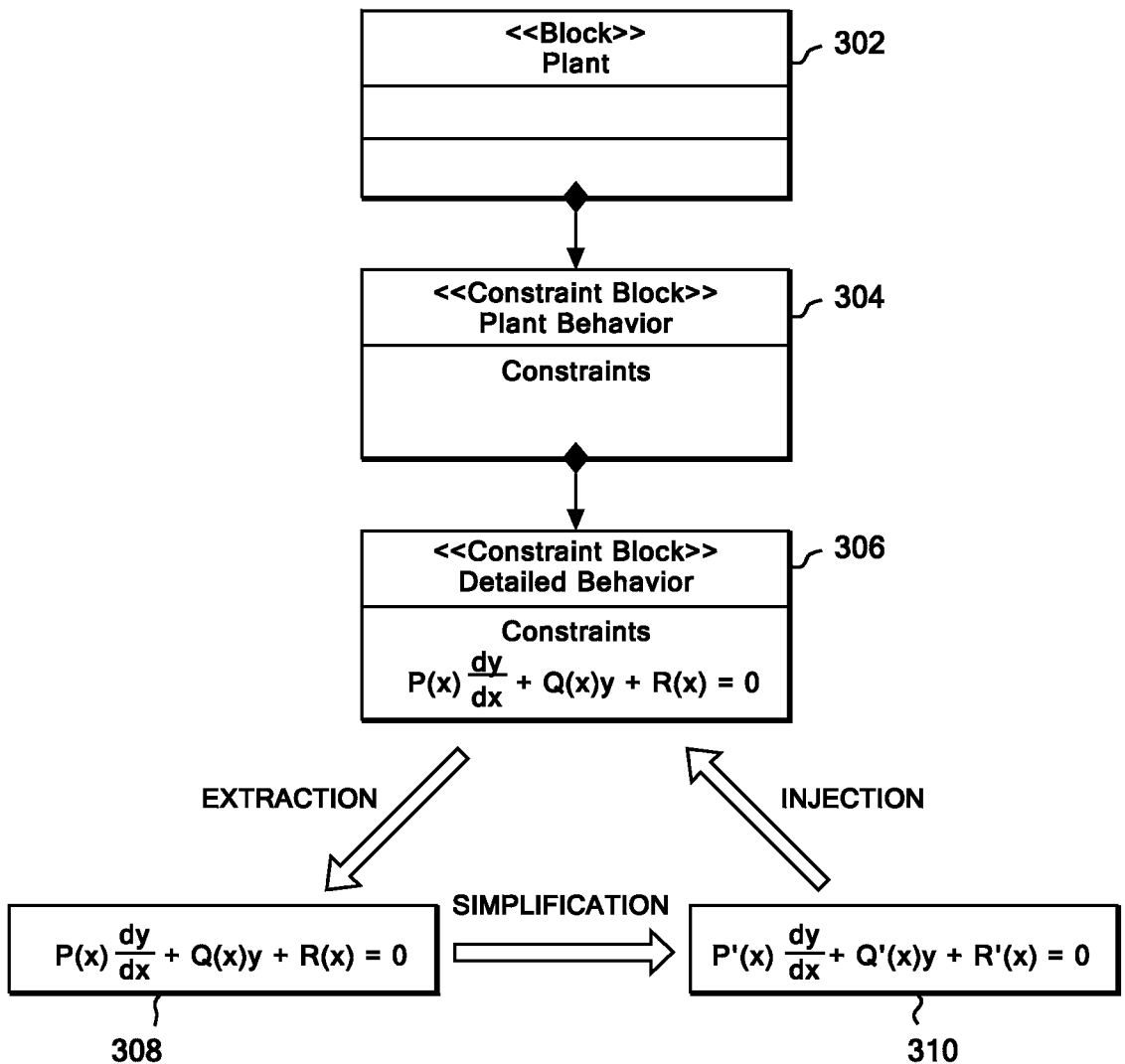
FIG. 3 is a diagram showing extraction of a math equation from a SysML block and extraction of a simplified math equation.

Blocks 302, 304 and 306 in FIG. 3 show examples of SysML class diagrams, respectively.

As described above, MATLAB®/SIMULINK® is employed as the simulation modeling system 204 in this embodiment. However, the simulation modeling system 204 is not limited to this, and any simulation modeling tool such as open source Scilab/Scicos can be used.

On the simulation modeling system 204, the user can arrange functional blocks and also connect the functional blocks by GUI operation to create a source code 208, and also save the created source code 208 in the hard disk drive 108. In addition, the user can read and edit the source code 208 as needed. The source code 208 may include an MDL file (SIMULINK® model file) for describing a dependency relationship between the functional blocks.

The math equation extraction module 210 extracts an expression that predetermines a behavior or a constraint expression from a specified block in the UML/SysML modeling system 202 and, preferably, the math equation extraction module 210 arranges the expression on the main memory 106 for later processing. In the example shown in FIG. 3, a math equation (a differential equation in this case) is included in the block 306 and is extracted by the math equation extraction module 210 as a math equation 308.

The math equation conversion module 212 has a function to convert a block diagram described in the simulation modeling system 204 into a corresponding differential equation and preferably a function to arrange the differential equation on the main memory 106. The math equation conversion module 212 can be basically created by a program such as C, C++, Java® or other similar programs, and also can be implemented by a combination of MAPLE™ and MAPLESIM®.

Figure 4:
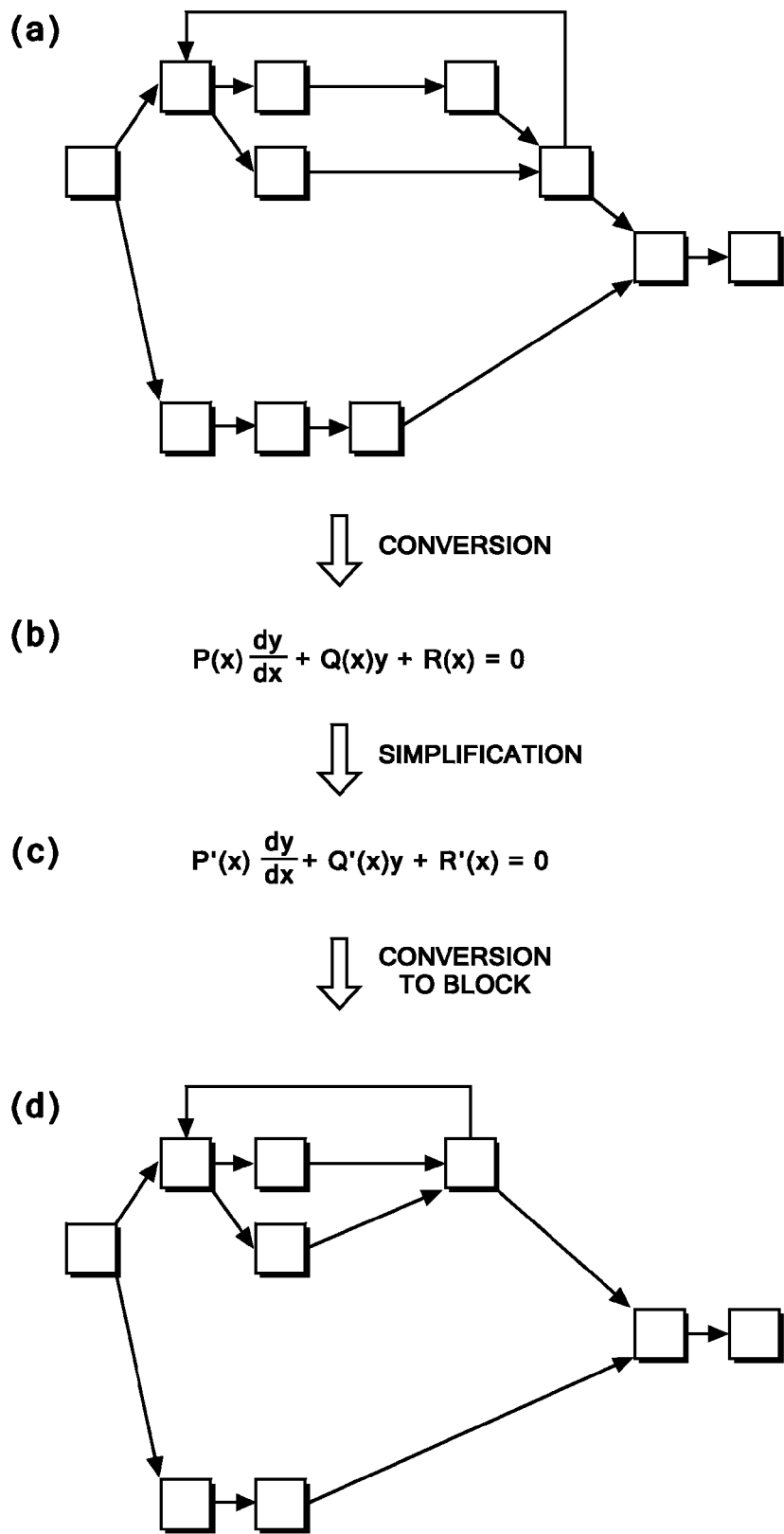
FIGS. 4A to 4D are diagrams showing how a block diagram is converted into a math equation and how a simplified math equation is converted into the block diagram.

FIG. 4A shows an example of a block diagram created by the simulation modeling system 204. The math equation conversion module 212 converts the block diagram shown in FIG. 4A into a differential equation shown in FIG. 4B.

By use of a function of the CAS 216, the interval analysis module 214 expands into Volterra series each coefficient of a math equation including a differential equation received from the math equation extraction module 210 or the math equation conversion module 212. The Volterra series expansion is described in documents such as Japanese Patent Application Publications No. Hei 11-261436, No. 2006-86681, No. 2006-260244, and No. 2006-28746 and also has been publicly known. Thus, the Volterra series expansion is not described herein in detail.

Note that, besides the Volterra series expansion, any series expansion such as a Taylor expansion can be used as the series expansion in an embodiment of the present invention in accordance with the intended use.

The interval analysis module 214 has a function to create an interval for interval analysis on the basis of the coefficient expanded in series and then to pass the created interval to the CAS 216.

The CAS 216 expands into Volterra series a math equation itself or a solution of a differential equation, which is provided from the math equation extraction module 210 or from the math equation conversion module 212. The CAS 216 then obtains an expanded series 218 and saves the expanded series 218 in the hard disk drive 108 as the series expanded from the solution of the math equation. The expanded series 218 includes data obtained by the Volterra series expansion of the coefficient of the math equation including a differential equation received from the math equation extraction module 210 or the math equation conversion module 212.

The stability determination module 220 operates cooperatively with the interval analysis module 214 and the CAS 216 so as to obtain a simplified math equation 222. The operation of the stability determination module 220 will be described later in detail with reference to the flowcharts respectively shown in FIGS. 5 and 6.

The stability determination module 220 creates the simplified math equation 222 as a result of processing, and in an embodiment, the stability determination module 220 arranges the simplified math equation 222 in a predetermined region of the main memory 106. The simplified math equation 222 is denoted by reference numeral 310 in the SysML block in FIG. 3, and is shown in FIG. 4C for SIMULINK®.

The math equation injection module 224 injects the simplified math equation 222 into the SysML block and then overwrites the math equation 222 in the SysML block. In FIG. 3, the simplified math equation 310 is injected into the block 306.

The conversion-to-block diagram module 226 has a function to convert the simplified math equation 310 shown in FIG. 4C into a block diagram as shown in FIG. 4D. Such conversion of a differential equation into a block diagram is achieved by expressing the differential equation, which is the simplified expression 310, as an expression in MATLAB® and then setting the expression to be a block called an S-function, which is a block usable in SIMULINK®. Note that such conversion sometimes requires processing to be performed manually.

The genus determination module 228 has a function to find a genus of the block diagram as shown in FIG. 4D obtained from conversion of the differential equation and thereby to determine the validity of the block diagram. The genus is a topological property and refers to the number of holes opened on a curved surface. More detailed processing to be performed by the genus determination module 228 will be described later in detail with reference to the flowchart shown in FIG. 7.

Next, processing to be performed by the stability determination module 220 shown in FIG. 2 will be described with reference to the flowcharts respectively shown in FIGS. 5 and 6. First, in Step 502 shown in FIG. 5, the math equation conversion module 212 converts a block diagram as shown in FIG. 4A, or the math equation extraction module 210 extracts a math equation from a block as shown in FIG. 3. Thus, a math equation including a differential equation is prepared on the main memory 106.

Note that, hereinafter, a description will be given taking a differential equation as an example, but the same goes for an ordinary math equation. Specifically, the differential equation is described as follows (equation 1):

$$P(x)\frac{dy}{dx} + Q(x)y + R(x) = 0 \tag{1}$$

Specifically, suppose $P(x)=Q(x)=0$. In this case, only $R(x)$ is left, and the equation results in an ordinary math equation not including a differential equation. In addition, although a first-order differential equation is used in this example, it is understood that a higher order differential equation may be used in some cases. Nevertheless, for most deign purposes, a differential equation up to second order is sufficient as typically is the case in Newton's equation. Moreover, the differential equation may be a simultaneous differential equation as long as the equation is solvable by the CAS.

According to an embodiment of the present invention, instead of solving such a differential equation by the CAS 216 without any change, each of the functions $P(x)$, $Q(x)$ and $R(x)$ of the differential equation is expanded into series by a function of the CAS 216.

In an embodiment of the present invention, the series expansion used is a Volterra series expansion, which is normally used in a nonlinear system analysis. Such a Volterra series expansion is generally described as follows (equation 2).

$$y(n) = h_0 + \sum_{p=1}^{\infty} h_p[x(n)] \tag{2}$$

$$h_p[x(n)] = \sum_{m_1=0}^{\infty} \cdots \sum_{m_p=0}^{\infty} h_p(m_1, \ldots, m_p) x(n-m_1) \cdots x(n-m_p)$$

In this expression, infinity represented by ∞ is truncated to an appropriate number of finite terms in accordance with an available memory size determined on the basis of the size limitation of the main memory 106. In this expression, $h_p(m_1, \ldots, m_p)$ is called a Volterra kernel. In this embodiment, an exponential function, a trigonometric function, an algebraic function or the like is used for $x(n-m_i)$ ($i=1, \ldots, p$) depending on situations.

Note that, although some patent application publications are already cited above as a prior art reference regarding the Volterra series expansion, for a more detailed description of the Volterra series expansion method, refer to, for example, Analytical and Numerical Methods for Volterra Equations (Studies in Applied and Numerical Mathematics) by Peter Linz (Hardcover—Jan. 1, 1987).

In addition, although the Volterra series expansion is used as a series expansion assumed in this embodiment, the present invention is not limited to the Volterra series expansion, and another known series expansion such as a Taylor series expansion or a Fourier series expansion can be used, depending on the situation.

When each of the functions $P(x)$, $Q(x)$ and $R(x)$ is expanded into Volterra series, if each expansion is truncated to the terms of $x(n-m_1) \ldots x(n-m_p)$, a coefficient sequence including a Volterra kernel is obtained for each of the functions $P(x)$, $Q(x)$ and $R(x)$.

Then, when the sequence of $x(n-m_1) \ldots (n-m_p)$ is described as X in order to express the sequence as a vector, $P(x)$, $Q(x)$ and $R(x)$ can be described as $P(x)=pX$, $Q(x)=qX$, $R(x)=rX$ by the vectors p, q and r of coefficients. Then, the components of the vectors p, q and r are put in a sequence and described as a vector $\alpha$.

In Step 504, the CAS 216 solves the differential equation. In the present embodiment of the invention, the solution thereof is described as $\beta X$ by the Volterra series expansion. The X herein is the same as the X described in relation to $P(x)$, $Q(x)$ and $R(x)$. The value of $\beta$ is stored in an appropriate region of the main memory 106 for later reference.

In Step 506, the interval analysis module 214 replaces one element $\alpha 1$ of the vector $\alpha$ with interval $[\alpha 1, \delta]=\alpha 1 \pm \delta$ by use of a certain small perturbation value $\delta$. Then, the CAS 216 again solves the differential equation by using this interval coefficient vector $\alpha I$. Then, in the embodiment of the present invention, the solution thereof is described as $\beta IX$ by the Volterra series expansion. The value of vector $\beta I$ is stored in an appropriate region of the main memory 106 for later reference.

Note that, the interval analysis is a technique used in a self-validating numerical calculation, and its basic operations are as follows.

$$[A,\alpha]+[B,\beta]=[A+B,\alpha+\beta]$$

$$[A,\alpha]-[B,\beta]=[A-B,\alpha+\beta]$$

$$[A,\alpha]\times[B,\beta]=[AB,A|\beta|+|B|\alpha+\alpha\beta] \quad (3)$$

Further, $f([A, \alpha])$ or the like can be defined for any function $f(x)$.

For more details of the interval analysis technique, refer to OISHI Shinichi, "Numerical Calculation with Guaranteed Accuracy" Modern Nonlinear Science Series 6, CORONA PUBLISHING CO., LTD., (2000).

In Step 508, a comparison is made between the coefficient vector $\beta I$ of the solution by interval arithmetic and a coefficient vector $\beta$ of the solution by normal arithmetic. More specifically, a certain distance function d( ) is given, and the value of $d(\beta, \beta I)$ is calculated.

A distance used in this embodiment is a Mahalanobis distance based on correlations between multi-variables. Here, the distance is described as $dM(\beta, \beta I)$ in particular. The Mahalanobis distance is defined as a square root of a vector difference value multiplied by an inverse of a covariance matrix. Note that, the distance used in the present invention is not limited to the Mahalanobis distance, and another known distance such as a Euclidean distance, a Manhattan distance, or the like can be also used depending on situations in other embodiments.

In the next Step 510, whether or not the inter-vector distance $dM(\beta, \beta I)$ is equal to or less than a preset value $\delta result$, i.e., whether $dM(\beta, \beta I)<=\delta result$ is true is determined, by use of the certain preset value $\delta result$. If not, the next coefficient of the coefficient vector $\alpha$ is selected in Step 512, and the processing returns to Step 506. Specifically, in Step 506, an interval is created on the basis of the selected coefficient, and then the differential equation is solved.

If $dM(\beta, \beta I)<=\delta result$ is determined to be true in Step 510, the processing proceeds to Step 514 where the CAS 216 performs the processing again to solve a differential equation for the target coefficient $\alpha 1$ by setting the target coefficient to 0. When the coefficient vector of the solution of the result of the processing is set to $\beta 0$, the value of $dM(\beta, \beta 0)$ is calculated in Step 516.

In Step 518, whether or not $dM(\beta, \beta 0)<=\delta result$ is true is determined. Note that, the preset value to be used for comparison here may be a value different from the preset value used in Step 510.

If $dM(\beta, \beta 0)<=\delta result$ is determined to be true in Step 518, it is determined in Step 520 to omit the target coefficient. Information of the determination is stored in a predetermined location of the main memory 106, and is later used for providing a simplified differential equation 222.

Meanwhile, if $dM(\beta, \beta 0)<=\delta result$ is determined to be not true in Step 518, the omission priority for the target coefficient is lowered in Step 522, i.e., the coefficient is not omitted actually.

After Step 520 or 522, the processing proceeds to Step 524 where it is determined whether or not the processing is completed for all the coefficients which are the components of the vector $\alpha$. If not, the processing returns to Step 506, and if so, the processing moves to the processing shown by the flowchart in FIG. 6.

Figure 6:
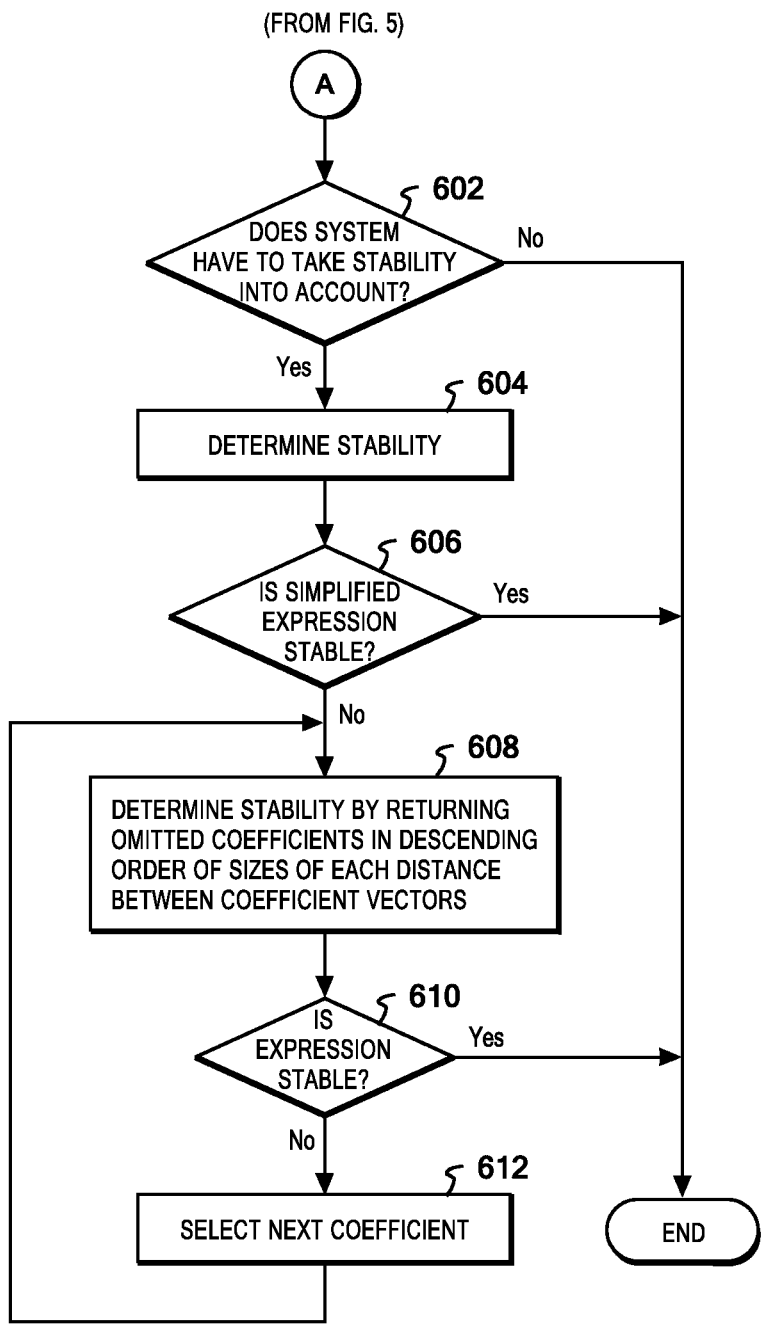
FIG. 6 is a flowchart of processing to simplify a math equation.

In Step 602 shown in FIG. 6, whether or not the system has to take stability into account is determined. A system that does not have to take stability into account is a system in which there is no feedback loop, and for which it is known in advance that the output is gradually reduced when the input is no longer received.

If the system is determined to be a system that does not have to take stability into account, the processing immediately terminates.

If it is determined in Step 602 that the system is a system that has to take stability into account, the processing proceeds to Step 604 where the stability of the system including a simplified expression is determined. Here, any of conventionally known methods can be used as a stability determination method, but the most typical one is a Nyquist stability criterion. Note that, the Nyquist stability criterion is described in the literatures of automatic control theory and is not the gist of the present invention. Therefore, a detailed description thereof is not provided herein.

In addition, if the system is a discrete system, a determination method based on eigenvalues of a state matrix can be used.

When the system including a simplified expression is determined to be stable in Step 606 in the manner described above, the processing terminates.

When the system including a simplified expression is determined to be unstable in Step 606, the following processing is made in Step 608. Specifically, the coefficients which are the components of $\alpha$ are returned to the simplified expression in a descending order of the sizes of the inter-vector distances $dM(\beta, \beta I)$ each of which is a distance between $\beta I$ and $\beta$ to be calculated when a certain coefficient of $\alpha$ is returned. Then, in Step 610, the stability of the system is determined again. The stability determination method used here may be the same as the one used in Step 604.

When the system is determined to be stable in Step 610 as a result, the processing terminates. When the system is determined to be unstable in Step 610, the next coefficient is selected in a descending order of the inter-vector distances $dM(\beta, \beta I)$ in Step 612. Then, the processing returns to Step 608.

Although not illustrated in the flowchart in FIG. 6, the processing is terminated as an error when the system does not become stable even after all the coefficients are returned.

Figure 5:
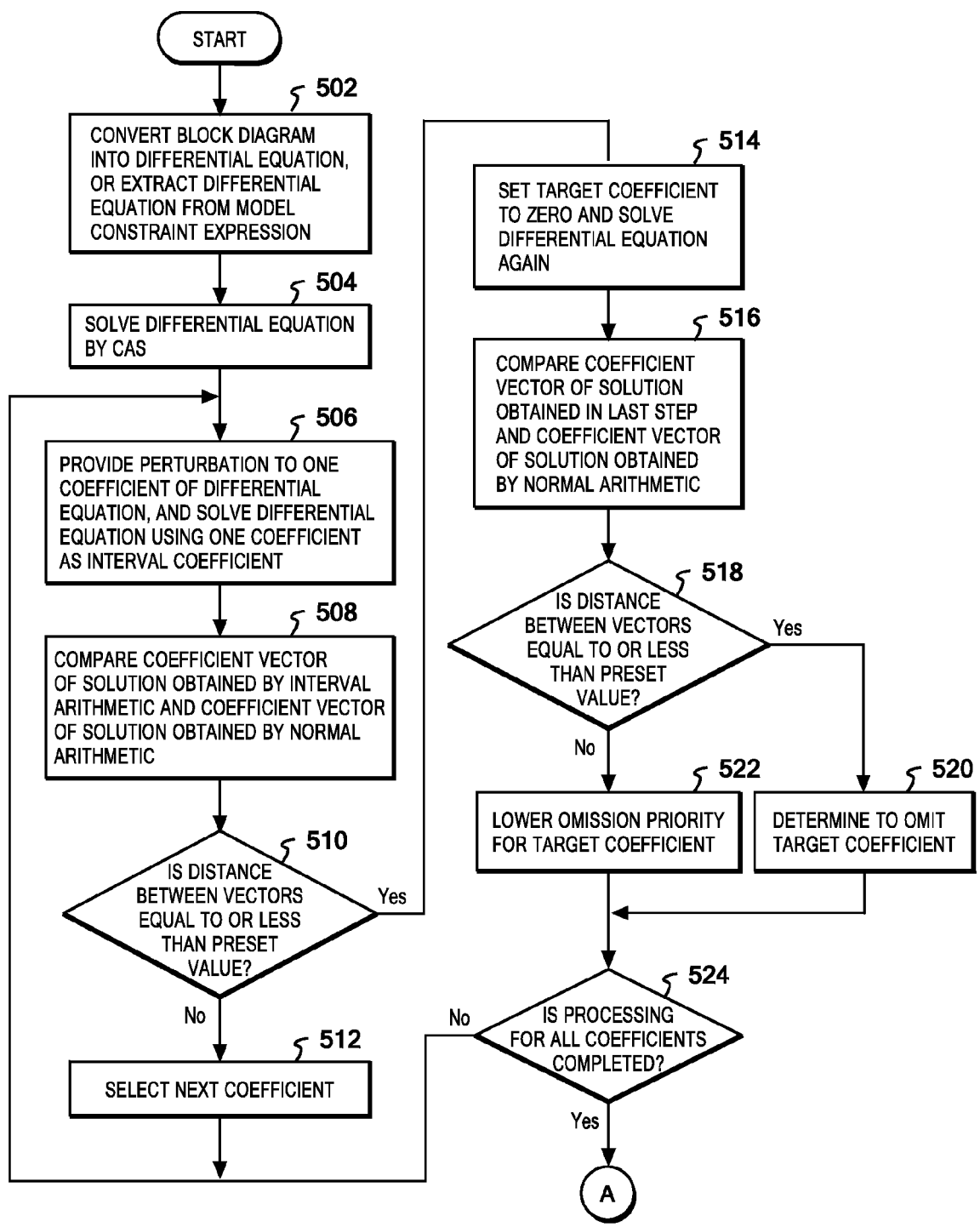
FIG. 5 is a flowchart of processing to simplify a math equation.

Eventually, as a result of the processing shown in FIGS. 5 and 6, the following simplified math equation 222 is obtained, in which the Volterra series expansion terms of P(x), Q(x) and R(x) are partially omitted.

$$P'(x)\frac{dy}{dx} + Q'(x)y + R'(x) = 0 \quad (4)$$

Here, in the processing shown in FIG. 5, it may seem acceptable to directly perform a comparison between the solutions by setting the target coefficient to zero in Step 514, without going through the processing to find the solution of the differential equation on the basis of the interval coefficient in Step 506. However, if the solution is found by setting the target coefficient to zero in Step 514 without going through the processing to find the solution of the differential equation on the basis of the interval coefficient, the solution may end up with an unstable localized solution. For this reason, it is necessary to find the solution of the differential equation in advance on the basis of the interval coefficient.

When obtained in the manner described above, the math equation injection module 224 injects the aforementioned simplified math equation 222 into the original block as shown in FIG. 3, or the conversion-to-block diagram module 226 converts the simplified math equation 222 into a block diagram as shown in FIG. 4D.

In the above-described embodiment, processing is performed as follows. Each coefficient of a differential equation is expanded into Volterra series in Step 502; a solution of the differential equation is expanded into Volterra series in Step 504; a solution of the differential equation as a result of the interval analysis in Step 506 is expanded into Volterra series; a solution of the differential equation is also expanded into Volterra series in Step 514. However, the embodiment is not limited to this case, and it is to be understood that the scope of the present invention includes variations to be described below.

First, it is possible to employ processing in which an interval analysis is performed on a coefficient of a differential equation without expanding the coefficient into Volterra series, but a solution of the differential equation is expanded into Volterra series expansion. Such processing is employed when dynamics of the system are known to some extent, but the behavior of the solution of the differential equation is not well known. In this case, processing is performed as follows. Each coefficient of the differential equation is not expanded into series in Step 502; but the solution of the differential equation is expanded into Volterra series in Step 504; an interval analysis in Step 506 is applied to the coefficient not expanded into series, and the solution of the differential equation of the result is expanded into Volterra series; a solution of the differential equation is also expanded into Volterra series in Step 514.

Next, it is also possible to employ processing in which an interval analysis is performed on each coefficient of a differential equation without expanding the coefficient into Volterra series, and a solution of the differential equation is not expanded into Volterra series, either. Such processing is employed in a case where dynamics of the system is known to some extent, and the behavior of the solution of the differential equation is also predictable to a large extent. In this case, processing is performed as follows. Each coefficient of a differential equation is not expanded into series in Step 502; the solution of the differential equation is not expanded into Volterra series, either, in Step 504; an interval analysis in Step 506 is applied to the coefficient not expanded into series, and the solution of the differential equation of the result is not expanded into Volterra series, either; in Step 514, a solution of the differential equation is not expanded into Volterra series. In this case, a coefficient vector of the solution is generated in the form of not being expanded into Volterra series and then is compared.

Moreover, it is also possible to employ processing in which an interval analysis is performed on a coefficient of a differential equation by expanding the coefficient in a Volterra series, but a solution of the differential equation is not expanded into Volterra series. Such processing is employed in a case, though rare, where the dynamics of the system is unknown to a large extent, but the behavior of the solution of the differential equation is predictable to a large extent. In this case, processing is performed as follows. Each coefficient of a differential equation is expanded into Volterra series in Step 502; but a solution of the differential equation is not expanded into Volterra series in Step 504; an interval analysis of coefficient is applied to the coefficient expanded into Volterra series and the solution of the differential equation of the result of the interval analysis in Step 506 is not expanded into Volterra series; in Step 514, a solution of the differential equation is not expanded into Volterra series. In this case, a coefficient vector of the solution is generated in the form of not being expanded into Volterra series and then is compared.

Next, processing to determine validity of a block diagram obtained from the conversion of a simplified math equation 222 will be described with reference to the flowchart shown in FIG. 7. The genus determination module 228 performs this processing.

Figure 7:
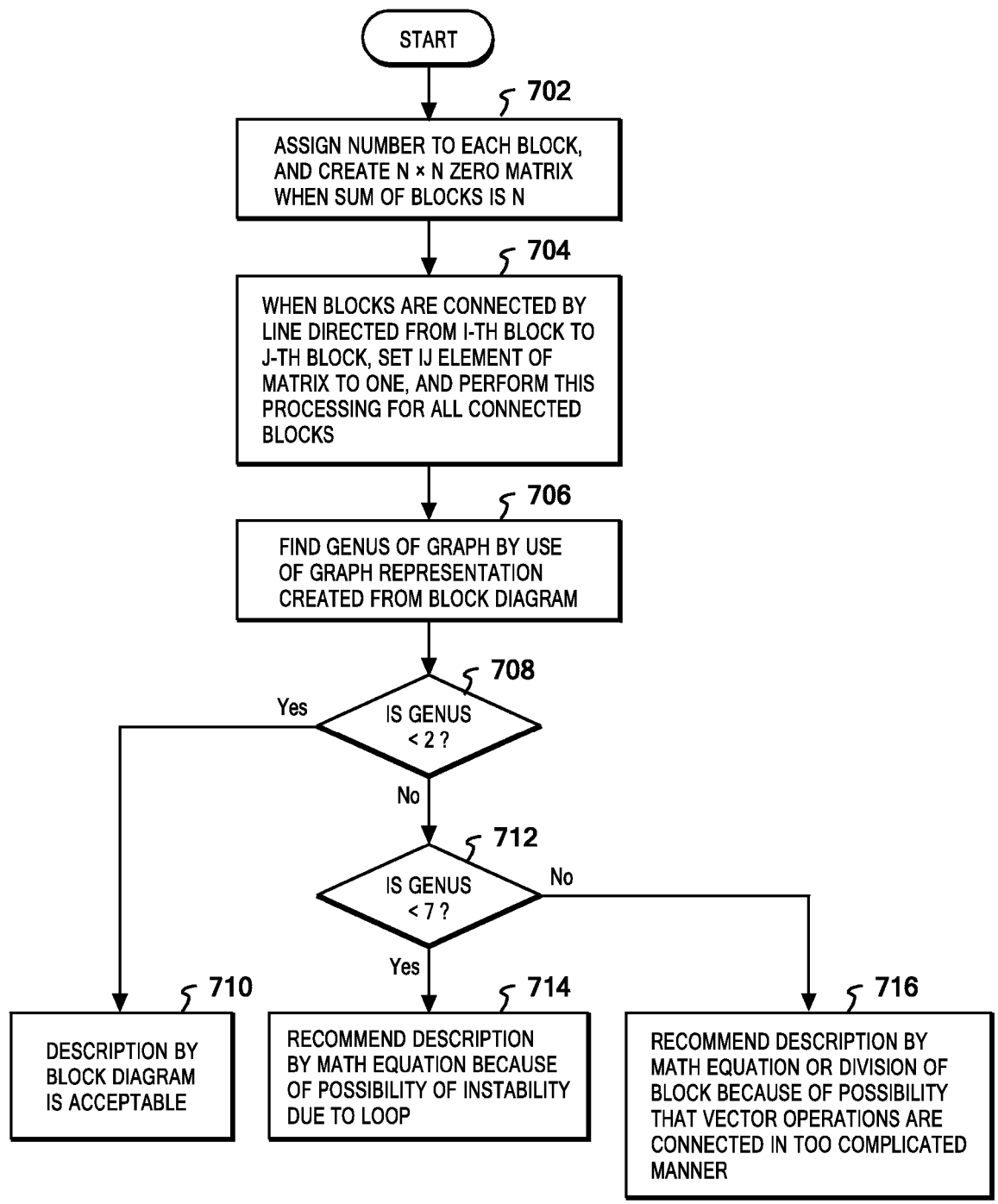
FIG. 7 is a flowchart of processing to determine a genus of a block diagram.

In Step 702 of FIG. 7, the genus determination module 228 assigns a number to each block in a block diagram, and when the sum of the blocks is N, an N×N zero matrix is created.

In Step 704, if a line directed from an I-th block to a J-th block is provided to connect the blocks with each other, the genus determination module 228 performs processing to set an IJ element of the matrix to one. The genus determination module 228 performs this processing for all the lines connecting blocks.

In Step 706, the genus determination module 228 uses information on the matrix corresponding to a graph representation generated from the block diagram and finds a genus of the graph. The algorithm to be used herein is not particularly limited, but, for example, the algorithm described in M. L. Furst, J. L. Gross, and L. A. McGeoch, "Finding a Maximum-Genus Graph Imbedding," Journal of ACM, Vol. 35, No. 3, July 1988, pp. 523-534 is used.

As a result, when the genus is determined to be smaller than two in Step 708, the processing proceeds to Step 710 and the block diagram is determined to be valid. The system can cause the display 114 to display a message indicating the determination result.

When the genus is determined to be not smaller than two but smaller than seven in Step 712, description of a math equation is recommended in Step 714 because of a possibility of instability due to loop. The system may cause the display 114 to display a message indicating the determination result in this case as well.

When the genus is determined to be seven or larger in Step 712, description of a math equation, or division of a block is recommended in Step 716 because of a possibility that vector operations are connected by lines but in a too complicated manner. The system may cause the display 114 to display a message indicating the determination result in this case as well.

Figure 8:
FIG. 8 is a diagram showing an example of designing an H2 optimum controller.

Next, an example of plant control will be described with reference to FIG. 8. This example is a problem of designing an H2 optimum controller for minimizing the following Expression 5.

$$J = \sum_{i=0}^{\infty} (x[i]^T Q x[i] + u[i]^T R u[i]) \quad (5)$$

In this example, the problem is solved on the basis of the following assumptions.

1. All coefficients of the plant may not be necessary in the controller design.
2. The controller structure can be simplified if state variables used by the controller are tolerable even having errors of several percent, and if matrices A and B include elements settable to zero.
3. The system according to the present invention shows as a recommendation that the coefficients marked in FIG. 8 be set to zero if the values in scalar matrices in which Q and R are set are allowed to have 5% deviation from their corresponding state variables obtained in the case no coefficients are omitted.
4. A matrix C is not considered as an evaluation target here because the matrix has no influence on the state variables or the controller design.
5. A Kalman filter is used for a comparison as the H2 controller here.
6. In addition, design parameters included in Q and R of the evaluation criterion may be simplified in the same manner. Thus, the controller may be further simplified if the design parameters are simplified.

Actually, a transfer function matrix related portion of the plant is calculated by (zI−A)−1B, each element in four rows by two columns of a given control target becomes a (cubic/quartic) function, but as a result of simplification, each element in three rows by two columns becomes (quadratic/quartic) function. Thus, an improvement in efficiency at the time of implementation can be expected because of a reduction of orders.

Specifically, when a math equation is simplified in accordance with the present invention, the number of sensors and wirings can be reduced because of the reduction in the number of orders and coefficients by optimization. Thus, the implementation cost can be reduced. As a result, it is possible to obtain an effect that the implementation of a high-speed controller obtained by the optimization is likely achieved.

Hereinabove, the present invention has been described on the basis of an embodiment, but the present invention is not limited to this embodiment. Thus, it is to be understood that the present invention is applicable to configurations and techniques implemented by various modifications, replacements, or the like that a person skilled in the art can obviously think of. For example, the present invention is not limited to a specific processor architecture, operating system, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 5 and 6, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A control method for a modeling system that designs by computer processing, the method comprising:
   a. obtaining a math equation from a model to be designed;
   b. finding a first solution from said math equation;
   c. finding a second solution from said math equation with one coefficient expanded in series set as an interval;
   d. finding a first distance between a first vector and a second vector with a coefficient of said first solution set as said first vector and with a coefficient of said second solution set as said second vector;
   e. finding a third solution from said math equation with said one coefficient set to zero in response to the fact that said first distance is not greater than a predetermined value, wherein if said first distance is greater than the predetermined distance, above steps c-e are iteratively repeated until said first distance is not greater than the predetermined value;
   f. finding a second distance between said first vector and a third vector with a coefficient of said third solution set as said third vector; and
   g. determining that a term of said one coefficient in the math equation is omissible, in response to the fact that said second distance is not greater than a predetermined value,
   wherein each of said first and second distances is a Mahalanobis distance.

2. The method according to claim 1, further comprising:
   determining said stability of said modeling system;
   determining, in response to said modeling system being unstable, the stability of said modeling system by returning omitted coefficients in descending order of the sizes of inter-vector distances until said modeling system becomes stable.

3. The method according to claim 1, wherein a coefficient of said math equation is expanded into Volterra series before any solution of said math equation is found.

4. The method according to claim 1, wherein said solutions of said math equations are found as a solution expanded into Volterra series.

5. The method according to claim 1, wherein said modeling system is a modeling system that creates a SysML block, further comprising:
   extracting a math equation from said block; and
   injecting into said block a simplified math equation obtained by omitting terms from said math equation.

6. The method according to claim 1, wherein said modeling system is a modeling system that creates a block diagram.

7. The method according to claim 6, further comprising:
   converting said block diagram into a math equation; and
   converting into a block diagram a simplified math equation obtained by omitting terms from said math equation.

8. The method according to claim 7, further comprising:
   finding a genus of said block diagram obtained by conversion from said simplified math equation.

9. A computer readable non-transitory article of manufacture, the computer readable non-transitory article of manufacture tangibly embodying computer readable instructions which, when executed, cause a computer to carry out hte steps of a method comprising:
   a. obtaining a math equation from a model to be designed;
   b. finding a first solution from said math equation;
   c. finding a second solution from said math equation with one coefficient in series set as an interval;
   d. finding a first distance between a first vector and a second vector with a coefficient of said first solution set as said first vector and with a coefficient of said second solution set as said second vector;
   e. finding a third solution from said math equation with said one coefficient set to zero in response to the fact that said first distance is not greater than a predetermined value;
   f. finding a second distance between said first vector and a third vector with a coefficient of said third solution set as said third vector; and
   g. determining that a term of said one coefficient in the math equation is omissible, in response to the fact that said second distance is not greater than a predetermined value.

10. A modeling system that designs by computer processing, the modeling system comprising:
   a memory;
   a processing device communicatively coupled to the memory;
   a modeling module communicatively coupled to the memory and processing device, said modeling module configured to obtain a math equation from a model to be designed;
   a calculation module communicatively coupled to the memory and processing device, said calculation module having a function to find a solution of said math equation, wherein the function causes said calculation means to calculate said math equation to which an interval of terms of said math equation is applied;
an interval analysis module, communicatively coupled to the memory and processing device, said interval analysis module configured to find a distance between two different solutions obtained by said calculation means; and
a stability determination module, communicatively coupled to the memory and processing device, said stability determination module configured to simplify said math equation by omitting terms from said math equation, wherein said math equation is simplified by said means for simplifying said math equation, in response to said distance between said solutions being smaller than a predetermined distance,
wherein each of said distance and predetermined distance is a Mahalanobis distance.

11. The modeling system according to claim 10, wherein said stability determination module is further configured to:
determine that said modeling system has to take stability into account,
stabilize said modeling system by returning said omitted terms to said math equation in descending order of the sizes of said distances between solutions until said modeling system becomes stable, in response to said modeling system being unstable.

12. The system according to claim 10, wherein said function expands into series a coefficient and a calculation result of said math equation.

13. The system according to claim 12, wherein said function uses terms to be expanded into series.

14. The system according to claim 12, wherein said interval analysis module is further configured to find a distance between terms expanded into series.

15. The system according to claim 10, wherein said modeling module is further configured to:
create a SysML block;
extract a math equation from said block; and
inject into said block a simplified math equation obtained by omitting terms from said math equation.

16. The system according to claim 10, wherein said modeling module is further configured to:
create a block diagram;
convert said block diagram into a math equation; and
convert into a block diagram a simplified math equation obtain by omitting terms from said math equation.

17. The system according to claim 16 further comprising:
means for converting said block diagram into a math equation; and
means for converting into a block diagram a simplified math equation obtained by omitting terms from said math equation.

18. The system according to claim 16, wherein the modeling module is further configured to find a genus of said block diagram obtained by conversion from said simplified math equation.

* * * * *